United States Patent [19]
Butler

[11] Patent Number: 4,739,897
[45] Date of Patent: Apr. 26, 1988

[54] HOLDER FOR THE PROTECTION OF REMOTE ELECTRONIC DEVICES

[76] Inventor: Lorraine M. Butler, 86-69 Springfield Blvd., Queens Village, N.Y. 11427

[21] Appl. No.: 840,193

[22] Filed: Mar. 17, 1986

[51] Int. Cl.⁴ .............................................. B65D 1/24
[52] U.S. Cl. ........................................ 220/22; 220/20; 220/21; 220/23.83; 206/320; 206/504; 206/561; 206/523; 206/591; 206/594; 206/576; 312/283; 312/286
[58] Field of Search ............... 206/44.11, 45.14, 45.15, 206/45.18, 214, 305, 320, 371, 504, 509, 511, 557, 558, 561, 562, 565, 576, 523, 591, 594; 220/20, 21, 22, 23.83, 23.4, 337, 346; 312/283, 284, 286; 232/43.1

[56] References Cited
U.S. PATENT DOCUMENTS

| | | | |
|---|---|---|---|
| 551,009 | 12/1895 | Tebbetts | 206/561 |
| 1,026,264 | 5/1912 | Hokanson | 312/283 |
| 1,423,845 | 7/1922 | Foss | 206/557 |
| 2,255,702 | 9/1941 | Gannaway | 206/561 |
| 2,386,573 | 10/1945 | Randall | 312/283 |
| 2,584,755 | 2/1952 | Stewart | 220/20 |
| 2,724,595 | 11/1955 | Amann | 220/20 |
| 2,864,491 | 12/1958 | Paterson | 312/286 |
| 2,956,687 | 10/1960 | Robichaud | 206/45.14 |
| 3,236,371 | 2/1966 | Regis, Jr. et al. | 206/561 |
| 3,362,564 | 1/1968 | Mueller | 220/340 |
| 3,669,131 | 6/1972 | Parker | 206/558 |
| 3,800,939 | 4/1974 | Cornelius | 220/22 |
| 3,817,372 | 6/1974 | Smith | 220/20 |
| 3,902,270 | 9/1975 | Molenaar | 206/511 |
| 3,935,944 | 2/1976 | Wilson et al. | 220/20 |
| 4,022,319 | 5/1977 | Jenkins | 232/43.1 |
| 4,068,760 | 1/1978 | Johnson, Jr. | 220/20 |
| 4,118,084 | 10/1978 | Sussman | 206/509 |
| 4,360,969 | 11/1982 | Collier | 206/509 |
| 4,384,647 | 5/1983 | Schweizer | 206/214 |
| 4,412,618 | 11/1983 | La Conte | 206/581 |
| 4,431,114 | 2/1984 | Kleinfeld | 220/337 |
| 4,494,690 | 1/1985 | Dupuis | 232/43.1 |

Primary Examiner—David T. Fidei
Attorney, Agent, or Firm—Michael I. Kroll

[57] ABSTRACT

A holder for a remote control unit is provided and consists of a floor panel disposed between and spanning a pair of spaced side panels, a front panel and a rear panel forming therebetween a remote control unit receiving compartment to receive and position the remote control unit. A lower compartment is formed beneath the floor panel so that batteries for the remote control unit can be stored within. A pair of holders can be secured together in a back-to-back relationship for holding two remote control units.

9 Claims, 1 Drawing Sheet

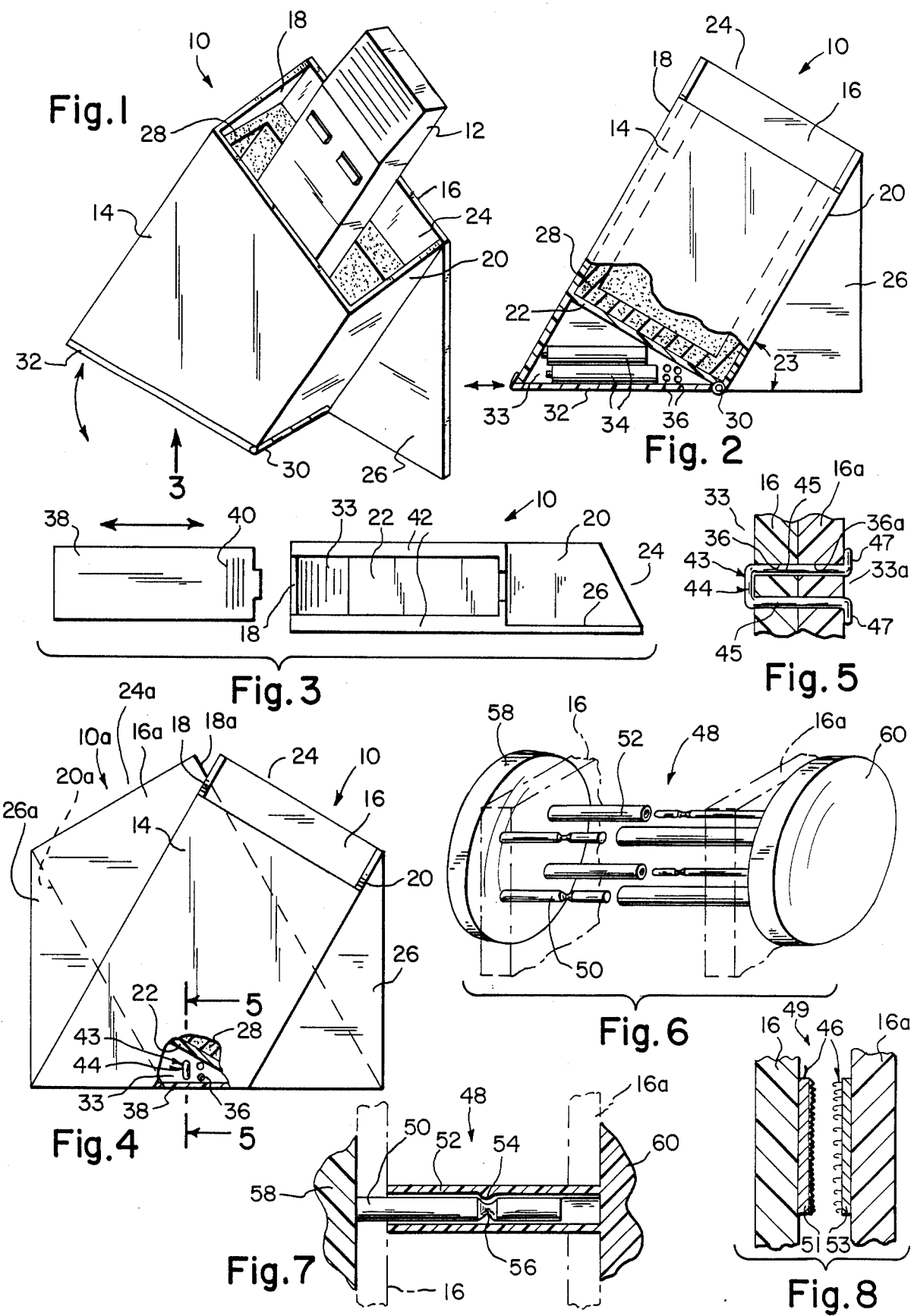

HOLDER FOR THE PROTECTION OF REMOTE ELECTRONIC DEVICES

BACKGROUND OF THE INVENTION

1. Field of the Invention

The instant invention relates generally to holders and more specifically it relates to a holder for a remote control unit.

2. Description the Prior Art

Numerous holders have been provided in prior art that are adapted to store and support various kinds of devices. For example, U.S. Pat. Nos. 1,502,385; 1,594,848; 3,494,479 and 4,440,299 all are illustrative of such prior art. While these units may be suitable for the particular purpose to which they address, they would not be as suitable for the purposes of the present invention as heretofore described.

SUMMARY OF THE INVENTION

A primary object of the present invention is to provide a holder for a remote control unit or units that will provide substantial protection to said unit or units.

Another object is to provide a holder for a remote control unit that includes an additional but separate storage compartment for batteries used by the remote control unit.

An additional object is to provide a holder for a remote control unit in which a pair of holders can be secured together back-to-back for holding two remote control units one for a television set and the other for a video tape player.

A further object is to provide a holder for a remote control unit that is simple and easy to use.

A still further object is to provide a holder for a remote control unit that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a front elevational view with parts broken away to better show details of the battery compartment with hinged cover.

FIG. 3 is a bottom view showing a slide cover for the battery compartment.

FIG. 4 is a front elevational view of two holders placed back-to-back with parts broken away to better show details of a connector therebetween.

FIG. 5 is a cross sectional view taken along line 5—5 in FIG. 4.

FIG. 6 is an enlarged exploded perspective view of an alternative form of connector for the holders.

FIG. 7 is an enlarged cross sectional view of a male and female leg of the connector in FIG. 6.

FIG. 8 is an enlarged cross sectional view of another alternative form of connector being VELCRO for the holders.

DETAILED DESCRIPTION OF THE PREFERRED EMBODIMENTS

Turning now descriptively to the drawings, in which similar reference characters denote similar elements throughout the several views, FIGS. 1 and 2 illustrate a holder 10 for a remote control unit 12 which consists of a pair of spaced side panels 18 and 20, a front panel 14, a rear panel 16 and a floor panel 22. The rear panel 16 is connected in spaced relationship to the front panel 14 by the pair of spaced side panels 18 and 20. The floor panel 22 is disposed between and spanning the side panels 18 and 20, the front panel 14 and the rear panel 16 forming therebetween a remote control unit receiving compartment 24 to receive and position the remote control unit 12. A lining 28, which can be foam rubber or any other soft material, is disposed in the remote control unit receiving compartment 24 for protecting the remote control unit 12 therein.

The side panels 18 and 20, the front panel 14 and the rear panel 16 are each formed with lower edges all of which lie in a first predetermined plane and define a base for the holder 10. The floor panel 22 is disposed in a second predetermined plane and the second predetermined plane is disposed at a first predetermined angle 23 with respect to the first predetermined plane.

The rear panel 16 includes an extension portion 26 which extends out from a side edge thereof. A lower edge of the extension portion 26 is contiguous with the lower edge of the rear panel 16, lying in the first predetermined plane therewith and forming with the lower edges of the front and side panels the base for the holder 10. The rear panel 16 includes an upper edge which extends higher than upper edge of the front panel 14.

A lower compartment 33 is formed between the front panel 14, the rear panel 16 and the side panels 18 and 20 beneath the floor panel 22 thereof so that batteries 34 for the remote control unit 12 can be stored within the lower compartment 33. A cover 32 extends across the lower compartment 33 for sealing the batteries 34 therein. The cover is hinged at 30 to the lower edge of the side panel 20. Another type of cover 38 that has ridges 40 for a finger grip is shown in FIG. 3. The cover 38 slides in a track 42 formed on the lower edges of the front and rear panels 14 and 16.

FIGS. 4 and 5 show a device 43 for connecting the holder 10 to a second identical holder 10a in back to back relationship. The connecting device 43 extends through the rear panels 16 and 16a of the first holder 10 and the second holder 10a in the lower compartments 33 and 33a to connect the holders together. The respective rear panels 16 and 16a have openings 36 and 36a which are aligned when the first and second holders 10 and 10a are placed in back to back relationship. The connecting device 43 includes a substantially U-shaped connector 44 that has legs 45 of which extend through the aligned openings 36 and 36a and are bent over at 47 to effect connection of the first holder 10 and the second holder 10a.

FIG. 6 and 7 show another connecting device 48 that includes a first connector member 58 that has male extenders 50 and female receivers 52, and a second connector member 60 that also has male extenders 50 and female receivers 52. When the first connector member 58 and the second connector member 60 are connected together the male extenders 50 and the female receivers 52 of the first connector member 58 will mate with respective female receivers 52 and male extenders 50 of the second connector member 60. Each male extender 50 has an indent groove 56 while each female receiver 52 has a detent 54 to inhance their connecting capabilities.

FIG. 8 shows still another connecting device 49 which includes a hook and loop pile fastener 46 having one half 51 connected to exterior of the rear panel 16 of the first holder 10 and the other half 53 connected to exterior of the rear panel 16a of the second holder 10a.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A holder for a remote control unit, comprising:
   (a) a pair of spaced side panels;
   (b) a front panel;
   (c) a rear panel connected in spaced relationship to said front panel by said pair of spaced side panels, said side panels, said front panel and said rear panel are each formed with lower edges all of which lie in a front predetermined plane and define a base for the holder for, said rear panel including an extension portion which extends out from a side edge thereof, a lower edge of said extension portion being contiguous with said lower edge of said rear panel, lying in said first predetermined plane therewith and forming with said lower edges of said front and side panels said base for the holder;
   (d) a floor panel disposed between and spanning said pair of side panels and forming with said pair of side panels and said front panel and said rear panel a remote control unit receiving compartment to receive and position the remote control unit, said floor panel being disposed in a second predetermined plane and said second predetermined plane being disposed at a first predetermined angle with respect to said first predetermined plane;
   (e) a cover disposed between and spanning said front and rear panels and forming with said floor panel and a one of said pair of side panels and said front panel and said rear panel a closed lower compartment disposed underneath said remote control unit receiving compartment and useable for storing batteries for the remote control unit, said floor panel being a common partition separating said closed lower compartment from said remote control unit receiving compartment; and
   (f) a lining disposed in said remote control unit receiving compartment for protecting said remote control unit therein.

2. A holder as recited in claim 1, wherein said rear panel includes an upper edge which extends higher than upper edge of said front panel.

3. A holder as recited in claim 2, wherein said cover is hinged to one of said lower edges of one of said side panels.

4. A holder as recited in claim 2, wherein said cover slides in a track formed on lower edges of said front and rear panels.

5. A holder as recited in claim 2, further comprising a means for connecting said holder to a second identical holder in back to back relationship.

6. A holder as recited in claim 5, wherein said connecting means extends through said rear panels of said first holder and said second holder in said lower compartments to connect said holders together.

7. A holder as recited in claim 6, further comprising:
   (a) said respective rear panels each having openings which are aligned when said first and second holders are placed in back to back relationship; and
   (b) said connecting means includes a substantially U-shaped connector having legs of which extend through said aligned openings and are bent over to effect connection of said first holder and said second holder.

8. A holder as recited in claim 6, wherein said connecting means includes:
   (a) a first connector member having male extender and a female receiver; and
   (b) a second connector member having a male extender and a female receiver whereby when said first connector member and said second connector member are connected together said male extender and said female receiver of said first connector member will mate with respective female receiver and male extender of said second connector member.

9. A holder as recited in claim 5, wherein said connecting means includes a hook and loop pile fastener having one half connected to exterior of said rear panel of said first holder and other half connected to exterior of said rear panel of said second holder.

* * * * *